United States Patent
Kawatani et al.

(10) Patent No.: US 6,935,104 B2
(45) Date of Patent: Aug. 30, 2005

(54) ENGINE CONTROL SYSTEM

(75) Inventors: Toru Kawatani, Tochigi (JP); Naoki Onoda, Tochigi (JP); Hiroshi Jyoutaki, Tochigi (JP); Ritsuko Shinozaki, Tochigi (JP); Yoshinori Takahashi, Tochigi (JP); Yoshinaka Takeda, Kanagawa (JP); Kenji Sasaki, Tochigi (JP); Kenji Kawai, Aichi (JP); Shinichi Saito, Tochigi (JP); Masayuki Takahashi, Tochigi (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 34 days.

(21) Appl. No.: 10/628,490

(22) Filed: Jul. 29, 2003

(65) Prior Publication Data

US 2004/0194451 A1 Oct. 7, 2004

(30) Foreign Application Priority Data

Jul. 29, 2002 (JP) ........................................ 2002-219438

(51) Int. Cl.$^7$ ................................................. F01N 3/00
(52) U.S. Cl. .............................. 60/286; 60/295; 60/297; 60/303
(58) Field of Search .......................... 60/276, 280, 285, 60/286, 295, 297, 303

(56) References Cited

U.S. PATENT DOCUMENTS

| | | | | |
|---|---|---|---|---|
| 5,845,487 A | * | 12/1998 | Fraenkle et al. ............... | 60/274 |
| 5,884,476 A | * | 3/1999 | Hirota et al. .................. | 60/286 |
| 6,173,571 B1 | * | 1/2001 | Kaneko et al. ............... | 60/286 |
| 6,357,226 B2 | * | 3/2002 | Borland ....................... | 60/298 |
| 6,427,439 B1 | * | 8/2002 | Xu et al. ...................... | 60/286 |
| 6,546,721 B2 | * | 4/2003 | Hirota et al. ................. | 60/297 |

* cited by examiner

*Primary Examiner*—Binh Q. Tran
(74) *Attorney, Agent, or Firm*—Birch, Stewart, Kolasch & Birch, LLP

(57) ABSTRACT

An engine control system comprises a NOx catalyst selectively reducing NOx from exhaust gases, a reducing agent supply providing the reducing agent to an exhaust system and positioned upstream of the NOx catalyst, NOx sensors detecting an amount of NOx in exhaust gases emitted by an internal combustion engine, a fuel injection system injecting fuel to the internal combustion engine in a main injection mode or a pilot-and-main injection mode, and a control unit activating the fuel injection system in the pilot-and-main injection mode when a NOx purifying efficiency determined on the basis of data of emitted NOx is equal to or below a preset purifying efficiency.

2 Claims, 5 Drawing Sheets

ENGINE CONTROL SYSTEM

This nonprovisional application claims priority under 35 U.S.C. §119(a) on Patent Application No(s), 2002-219,438 filed in JAPAN on Jul. 29, 2002, which is(are) herein incorporated by reference.

BACKGROUND OF THE INVENTION

1. Field of the Invention

The present invention relates to an engine control system provided with a NOx purifying facility purifying NOx in exhaust gases, and more particularly to an engine control system which injects fuel in a main injection mode or a pilot-and-main injection mode.

2. Description of the Related Art

Usually, NOx in exhaust gases emitted from an internal combustion engine is purified by a NOx purifying facility. For instance, a NOx purifying facility for a diesel engine is constituted by a catalytic converter containing NOx catalyst and provided in an exhaust system and selectively purifying NOx, and an urea solution supply arranged upstream of the catalytic converter.

The NOx catalyst includes a catalytic carrier carrying vanadium oxide ($V_2O_2$) to which urea solution is supplied as a reducing agent, and purifies NOx in an atmosphere filled with excess oxygen.

The hydrolysis and pyrolysis of the urea solution is expressed by the following formula. Hydrolyzed and pyrolyzed urea solution effuses $NH_3$.

$$(NH_2)2CO + H_2O \rightarrow 2NH_3 + CO_2 \quad (1)$$

The denitration of $NH_3$ and nitrogen oxide by the NOx catalyst is expressed by formulas (2) and (3).

$$4NH_3 + 4NO + O_2 \rightarrow 4N_2 + 6H_2O \quad (2)$$

$$2NH_3 + NO + NO_2 \rightarrow 2N_2 + 3H_2O \quad (3)$$

Referring to FIG. 5 of the accompanying drawings, the purifying efficiency of the NOx purifying facility to which ammonia (or urea solution) is added is high when a catalyst temperature is approximately 350° C., but is abruptly reduced at temperatures below 350° C., as shown by a solid line. When the ratio of NO:$NO_2$ in NOx is 1:1, the NOx purifying facility can purify NOx most quickly. Further, it has been known that a high NOx purifying efficiency can be maintained at the catalyst temperature of approximately 200° C., as shown by a double-dashed line.

Generally speaking, a ratio of $NO_2$:NOx in exhaust gases is 0:1, which is relatively small. Therefore, the NOx purifying efficiency is reduced as shown by the solid line in FIG. 5.

In order to overcome the foregoing problems, an oxidation catalyst supply may be added upstream of the NOx catalyst in the exhaust system in order to oxidize NO in exhaust gases to $NO_2$, raise an $NO_2$/NOx ratio, and supply $NO_2$ to the NOx catalyst. This seems effective in keeping a NOx purifying efficiency at a high level.

However, in the foregoing case, the oxidation catalyst supply has to be positioned upstream of a reducing agent supply in the exhaust system. This inevitably enlarges a purifying facility. Therefore, it is difficult to secure a space for the oxidation catalyst supply. Further, in the case of a diesel engine, $NO_2$ producing performance of the oxidation catalyst tends to be adversely affected by sulfur in exhaust gases resulting from sulfur components in fuel. Still further, purifying performance and durability of the catalyst may be affected by sulfur.

Therefore, the present invention aims at providing an engine control system which can increase an $NO_2$ ratio in NOx and purify NOx efficiently even if the NOx purifying efficiency is low.

SUMMARY OF THE INVENTION

The invention provides an engine control system which comprises: a NOx catalyst containing ammonia as a reducing agent, provided in an exhaust system of an internal combustion engine, and selectively reducing NOx from exhaust gases; a reducing agent supply providing the reducing agent to the exhaust system and positioned upstream of the NOx catalyst; a NOx sensor detecting an amount of NOx in exhaust gases emitted by the internal combustion engine; a fuel injection system injecting fuel to the internal combustion engine in a main injection mode performing main injection or a pilot-and-main injection mode performing pilot injection and main injection, the pilot injection preceding the main injection; and a control unit activating the fuel injection system in the pilot-and-main injection mode when a NOx purifying efficiency determined on the basis of data of emitted NOx is equal to or below a preset NOx purifying efficiency.

When the NOx purifying efficiency is low, fuel is injected in the pilot-and-main injection mode, which increases an $NO_2$/NOx ratio, and improving the NOx purifying efficiency.

The engine control system further includes a temperature sensor detecting a temperature of the NOx catalyst. The control unit activates the fuel injection system in the pilot-and-main injection mode when NOx is purified at a NOx purifying efficiency equal to or below the preset purifying efficiency and when the temperature detected by the catalyst temperature sensor is below a catalyst activating temperature.

When the NOx purifying efficiency is equal to or below the preset value and the catalytic temperature is also below a preset value, fuel will be injected in the pilot-and-main injection mode. This increases the $NO_2$/NOx ratio and reliably improves the NOx purifying efficiency.

DETAILED DESCRIPTION OF THE INVENTION

The present invention will be described with reference to an embodiment of an engine control system shown in FIG. 1. The engine control system is assumed to be incorporated in a multiple cylinder diesel engine 1 (called "the engine 1") which is installed in a vehicle (not shown).

The engine 1 is controlled by an engine control unit 3 (called "the engine ECU 3") of the engine control system. A NOx purifying facility 2 provided in an exhaust system is controlled by an exhaust gas control unit 4 (called "the exhaust ECU4"). The engine ECU3 and exhaust system ECU4 communicate with each other via a communication control line 5.

Figure 1:
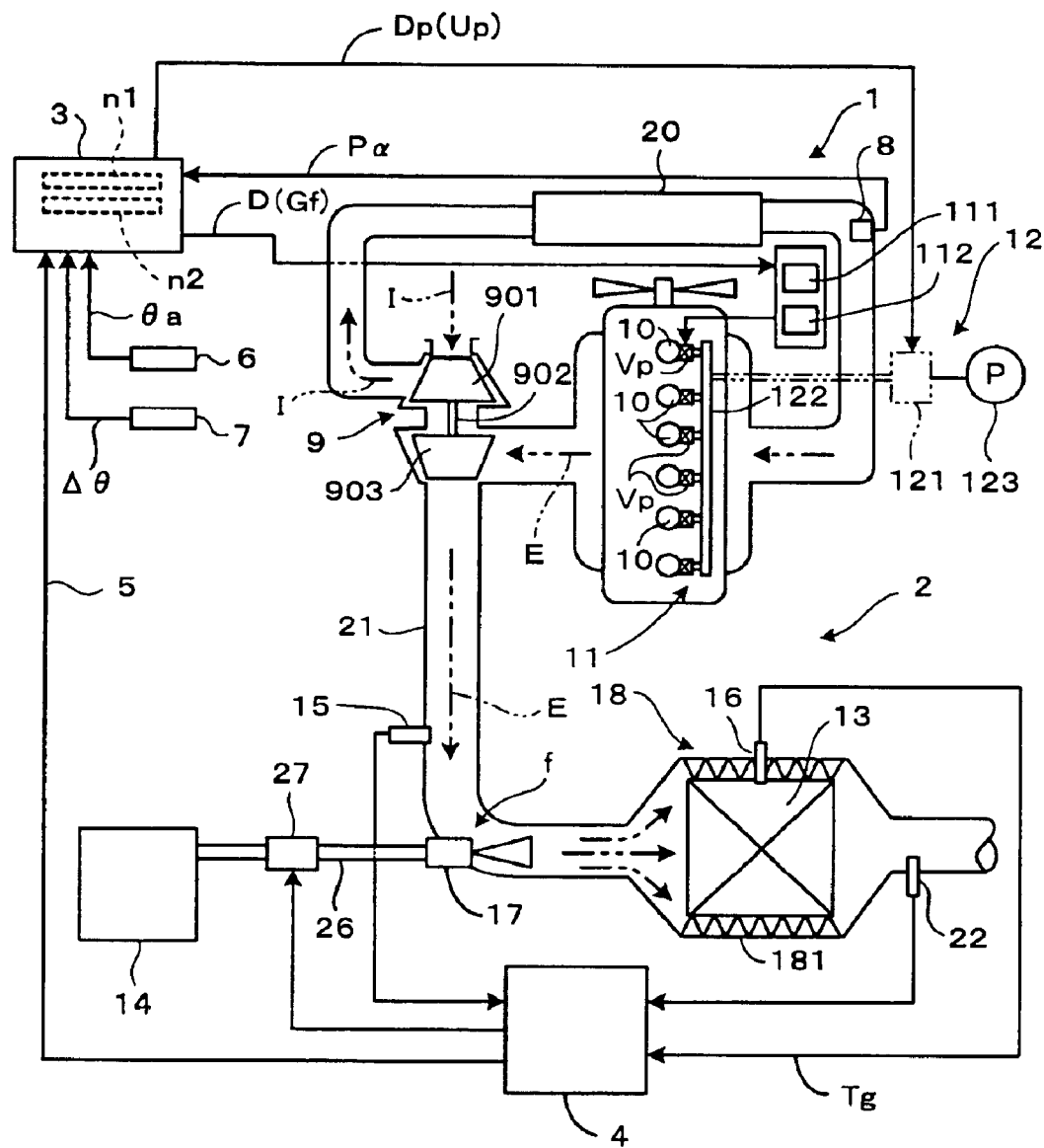
FIG. 1 is a schematic drawing of an engine control system and an engine to which the engine control system is applicable.

Referring to FIG. 1, the engine ECU3 is connected to an accelerator pedal depression sensor 6 and a crank angle sensor 7. The accelerator pedal depression sensor 6 detects an amount of accelerator pedal depression θa, and the crank angle sensor 7 detects crank angles and creates crank angle data Δθ. The crank angle data Δθ are used for the engine ECU 3 to derive engine speeds Ne.

An intake path I includes a compressor 901 of a turbocharger 9. The compressor 901 has a rotary shaft 902 connected to a turbine 903, thereby enabling supercharging of exhaust gases. In the intake path I, an intercooler 20 is positioned downstream of the turbocharger 9, and cools intake air. This is effective in improving volumetric efficiency of intake air to the engine 1, and increasing an engine output. Further, a pressure sensor 8 is provided downstream of the intercooler 20 in order to detect a boost pressure Pα.

The engine ECU3 has a number of ports at its input-output circuit, receives detection signals from the pressure sensor 8, accelerator pedal depression sensor 6, crank angle sensor 7 and so on, and sends control signals to a fuel injection system.

Figure 2A:
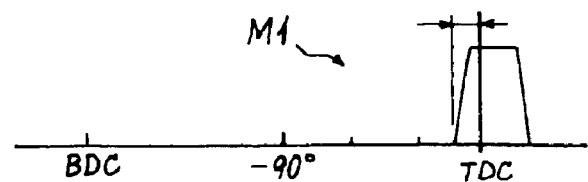
FIG. 2(a) is a diagram showing waveform of fuel pressure in a main injection mode of the engine control system.
Figure 2B:
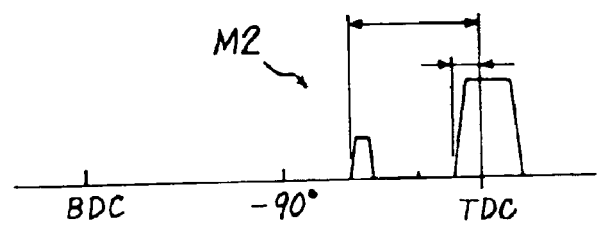
FIG. 2(b) is a diagram showing waveforms of fuel pressure in a pilot-and-main fuel injection mode of the engine control system.
Figure 3:
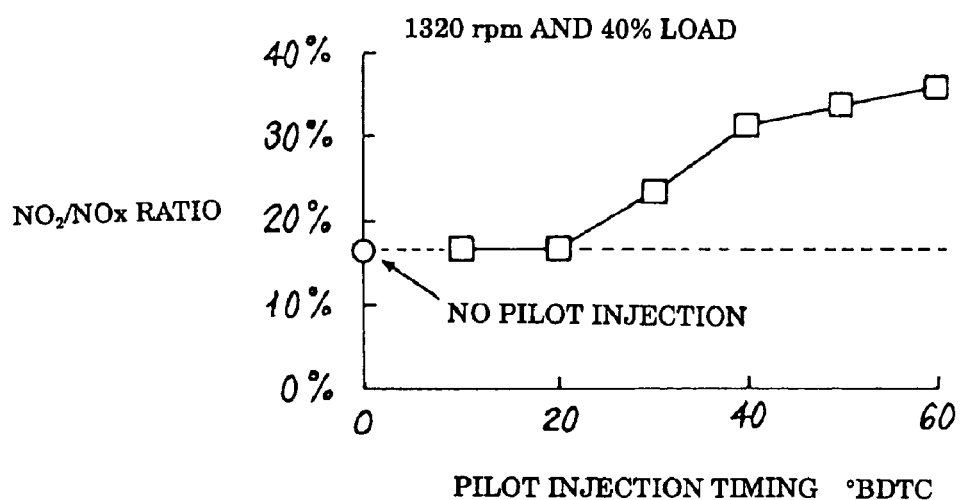
FIG. 3 is a graph illustrating variations of an $NO.sub.2$/NOx ratio when the engine is actuated in the pilot-and-main injection mode by the engine control system.

The fuel injection system includes a fuel pressure regulating section 12, and an injection controlling section 11 which injects fuel to a combustion chamber (not shown) using injectors 10. These sections 12 and 12. are controlled by the engine ECU3 functioning as a pressure controller n1 and an injection controller n2. The engine 1 actuates the injectors 10 in either a main injection mode M1 conducting only the main injection or a pilot-and-main injection mode M2 conducting pilot injection and main injection. The pilot injection precedes the main injection. Refer to FIGS. 2(a) and 2(b) which illustrate fuel pressure in waveforms when fuel is injected in the main injection mode and the pilot-and-main injection mode, respectively.

The fuel pressure regulating section 12 includes a fuel pressure regulator 121, which regulates pressure of high pressure fuel to a preset pressure and supplies preset pressure fuel to a common rail 122. High pressure fuel is supplied via a high pressure pump 123. Specifically, the fuel pressure regulator 121 is connected to the engine ECU3, and regulates fuel pressure in accordance with an output Dp of the fuel pressure controller n1, so that a pressure in the common rail 122 is stabilized to a preset value.

The injection controlling section 11 is of a common rail type, and injects high pressure fuel using the injectors 10 which are connected to the common rail 122 via electromagnetic valves Vp. The electromagnetic valves Vp are connected to the engine ECU3, and control a fuel injection amount Gf, a main injection timing (θ main), and a pilot injection timing (θp) in response to an output signal D (Gf) from the injection controller n2. In FIG. 1, only one electromagnetic valve Vp is shown to be connected to the engine ECU3 via one line.

The injection controller n2 derives a basic fuel injection amount INJb on the basis of the engine speed Ne and accelerator pedal depression θa (i.e., an engine load). The fuel injection amount Gf is derived by adding a revised water temperature dt and revised value dp of the boost pressure Pα0 to the basic fuel injection amount INJb (i.e., Gf=INJb+dt+dp).

The pilot-and-main injection mode M2 is adopted for the reasons described later in detail. In this mode, quality of fuel injected by the pilot injection is improved, i.e., the $NO_2$/NOx ratio of exhaust gasses is raised, which improves the NOx purifying efficiency.

If the pilot injection is not adopted, the $NO_2$/NOx ratio is approximately 15%, and NOx purification is slow in the NOx catalyst 13 as described later. However, as the pilot injection timing θp is advanced, the NOx purification is accelerated. For instance, when the engine 1 is operated at the pilot injection timing θp between BDTC 40° and 60°, the $NO_2$/NOx ratio is raised to 30% or more. Therefore, the NOx purification by the NOx catalyst (to be described later) is accelerated, which is effective in improving the NOx purifying efficiency.

The injection controller n2 selects the main injection mode M1 when a catalyst temperature Tg is high (e.g., 300° C. or higher) where the NOx purifying efficiency is relatively high, and injects all of fuel in the fuel injection amount Gf at the main injection timing θp.

Figure 4:
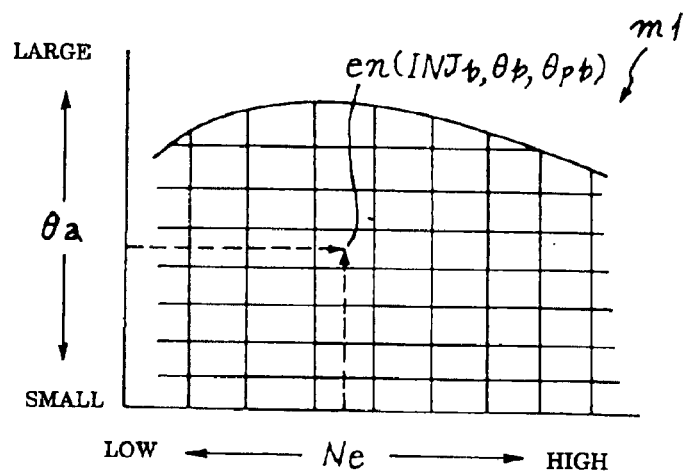
FIG. 4 is a map used to set a fuel injection amount and fuel injection timing in the pilot-and-main injection mode.

When the catalyst temperature Tg is low (e.g. approximately 200° C.), the injection controller n2 selects the pilot-and-main injection mode M2. The injection controller n2 has a map m1 (shown in FIG. 4) which is prepared by experimentally deriving the basic fuel injection amount INJb, basic injection timing θb and basic pilot injection timing θpb for each engine operation area en. The map m1 is used to raise the NOx purifying efficiency as much as possible in the engine operation area in accordance with the engine speed Ne and the accelerator pedal depression θa, and to improve the $NO_2$/NOx ratio. The $NO_2$/NOx ratio tends to vary with an amount of fuel injected by the pilot injection. For instance, it is known through experiments that when an engine load is 40%, the ratio $NO_2$/NOx is 36% at 4 mg/st, while the ratio is 44% at 8 mg/st.

The $NO_2$/NOx ratio is designed to be as large as possible by adjusting the basic fuel injection amount INJb, basic injection timing θb and basic pilot injection timing θpb. It is known that the $NO_2$/NOx ratio is variable between 5% and 80%, when an amount of NOx is derived using the map m1, and the pilot injection amount and pilot injection timing are controlled on the basis of the amount of NOx.

Referring to FIG. 1, the NOx purifying facility 2 includes: the NOx catalyst in an exhaust pipe 21; an urea solution supply (a reducing agent supply) 14 positioned upstream of the NOx catalyst 13 and pneumatically supplying a urea solution to an exhaust path E at a supply point f; upstream and downstream NOx sensors 15 and 22 detecting NOx concentrations Snoxf and Snoxr at positions upstream and downstream of the urea solution supply 14; a temperature sensor 16 detecting a temperature Tg of the NOx catalyst 13; and exhaust ECU4.

The NOX catalyst 13 is housed in a NOx converter 18 in the exhaust pipe 21 serving as the exhaust path E. The NOx converter 18 has a casing 181 which houses a catalytic carrier. The catalytic carrier carries metal catalyst (e.g., vanadium oxide $V_2O_5$).

Figure 5:
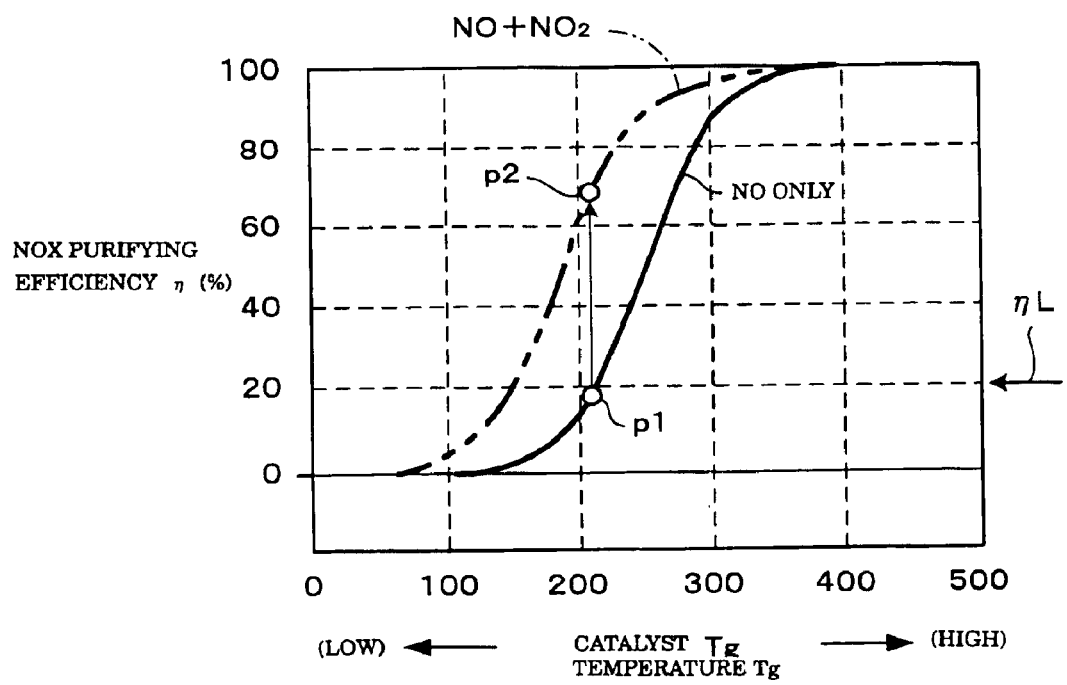
FIG. 5 is a graph showing relationships between catalyst temperatures and NOx purifying efficiency of a NOx catalyst in the engine of FIG. 1.

The Nox catalyst 13 can selectively reduce NOx in exhaust gases by using ammonium ($NH_3$) as the reducing agent. The urea solution is hydrolyzed to produce ammonium as expressed by the formula (1). Ammonium is supplied to the NOx catalyst 13. The NOx catalyst 13 mainly performs the reaction expressed by the formulas (2) and (3), using ammonium as the reducing agent, and accelerates denitration between $NH_3$ and nitrogen oxide. Especially, if the catalyst temperature Tg is low, i.e., approximately 200° C., but the $NO_2$/NOx ratio is large, the NOx purifying efficiency η can be raised as shown by the double-dashed line in FIG. 5. In this case, characteristics of NO are converted to those of $NO+NO_2$.

The urea solution supply 14 sprays the urea solution into an upper inlet of the NOx catalytic converter 18 via a nozzle 17 and an adjusting valve 27.

The exhaust ECU4 has a number of ports in its input-output circuit in order to receive detection signals from the upstream and downstream NOx sensors 15 and 22 and catalyst temperature sensor 16, and send control signals to the adjusting valve 27. Further, the exhaust system ECU4 transmits and receives data to and from the engine ECU3 via the control system communication line 5.

Further, the exhaust ECU4 calculates, using a map (not shown), an amount $D_{NHS}$ of the reducing agent to be added on the basis of the catalyst temperature Tg detected by the catalyst temperature sensor 16, and outputs the amount $D_{NHS}$ to the adjusting valve 27. The exhaust system ECU4 receives the NOx concentrations Snoxf and Snoxr at the positions upstream and downstream of the urea solution supply 14, and calculates the NOx purifying efficiency η{=(Snoxf−Snoxr)/Snoxf}.

Control processes of the engine ECU3 and the exhaust ECU4 will be described with reference to control routines shown in FIGS. 6 and 7.

Figure 6:
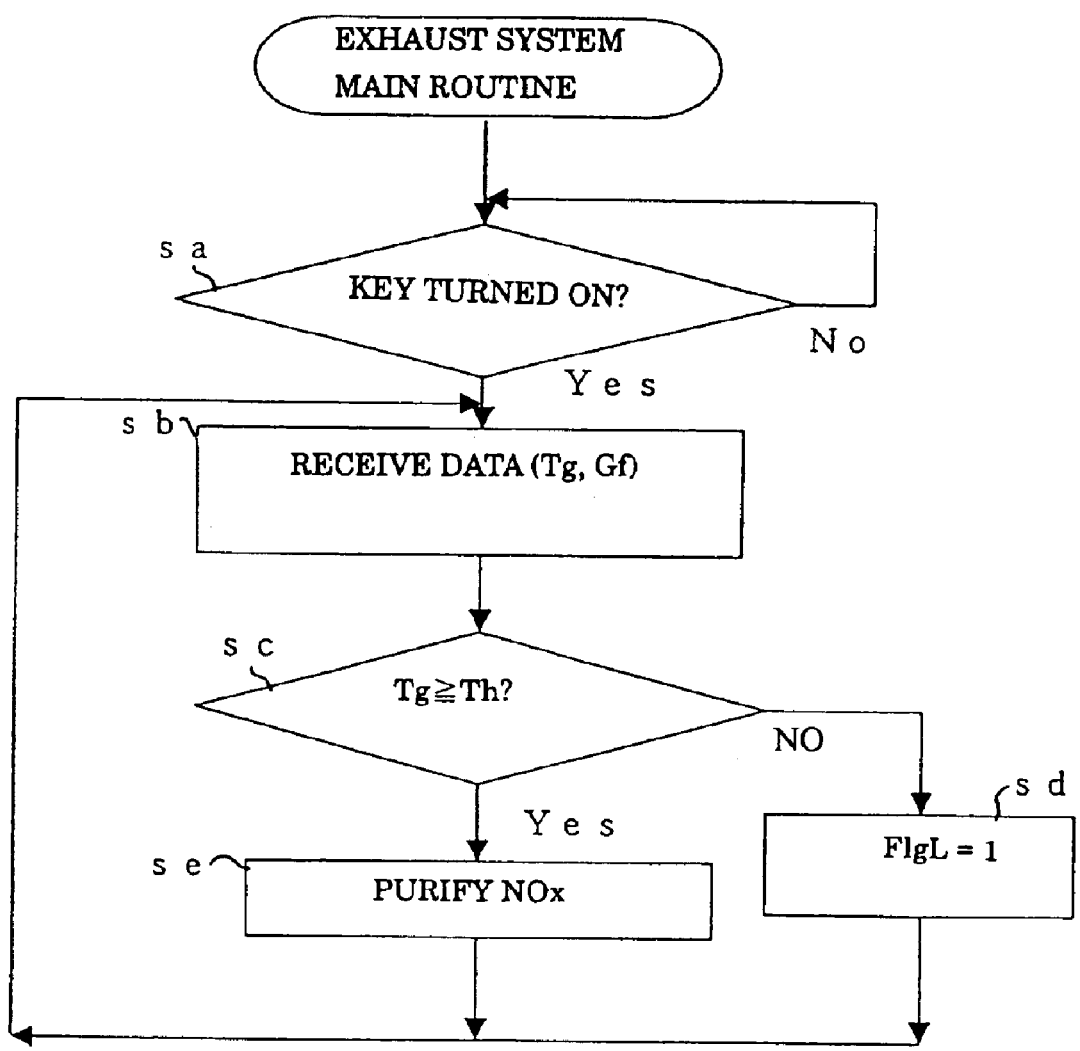
FIG. 6 is a flowchart of a main routine of an ECU of an exhaust system of the engine shown in FIG. 1.

When an engine key is turned on in order to activate the engine 1, the exhaust ECU4 periodically repeats a main control routine of FIG. 6. In step sa, it is determined whether or not the engine key is turned on. In step sb, the exhaust ECU4 receives a catalyst temperature Tg, fuel injection amount Gf, amount Unox of emitted NOx and so on from the engine ECU3, and determines whether or not the received data are appropriate. If the data are not appropriate, an alarm lamp (not shown) will be turned on.

The process proceeds to step sc once the data from the sensors are appropriate. In step sc, it is determined whether or not the catalyst temperature Tg is equal or higher than a preset temperature Th (e.g., 150° C.). If the catalyst temperature Tg is below the preset temperature Th, the process proceeds to step sd. Since the NOx purifying efficiency is low, a low temperature flag FlgL is set to 1, which is sent to the engine ECU3.

Conversely, when the catalyst temperature Tg is equal to or higher than the present temperature Th, the process proceeds to step se, where an output corresponding to the amount $D_{NHS}$ of the reducing agent to be added is sent to the adjusting valve 27. The amount $D_{NHS}$ is set on the basis of the detected catalyst temperature Tg. Thereafter, the process is returned to step sb.

Figure 7:
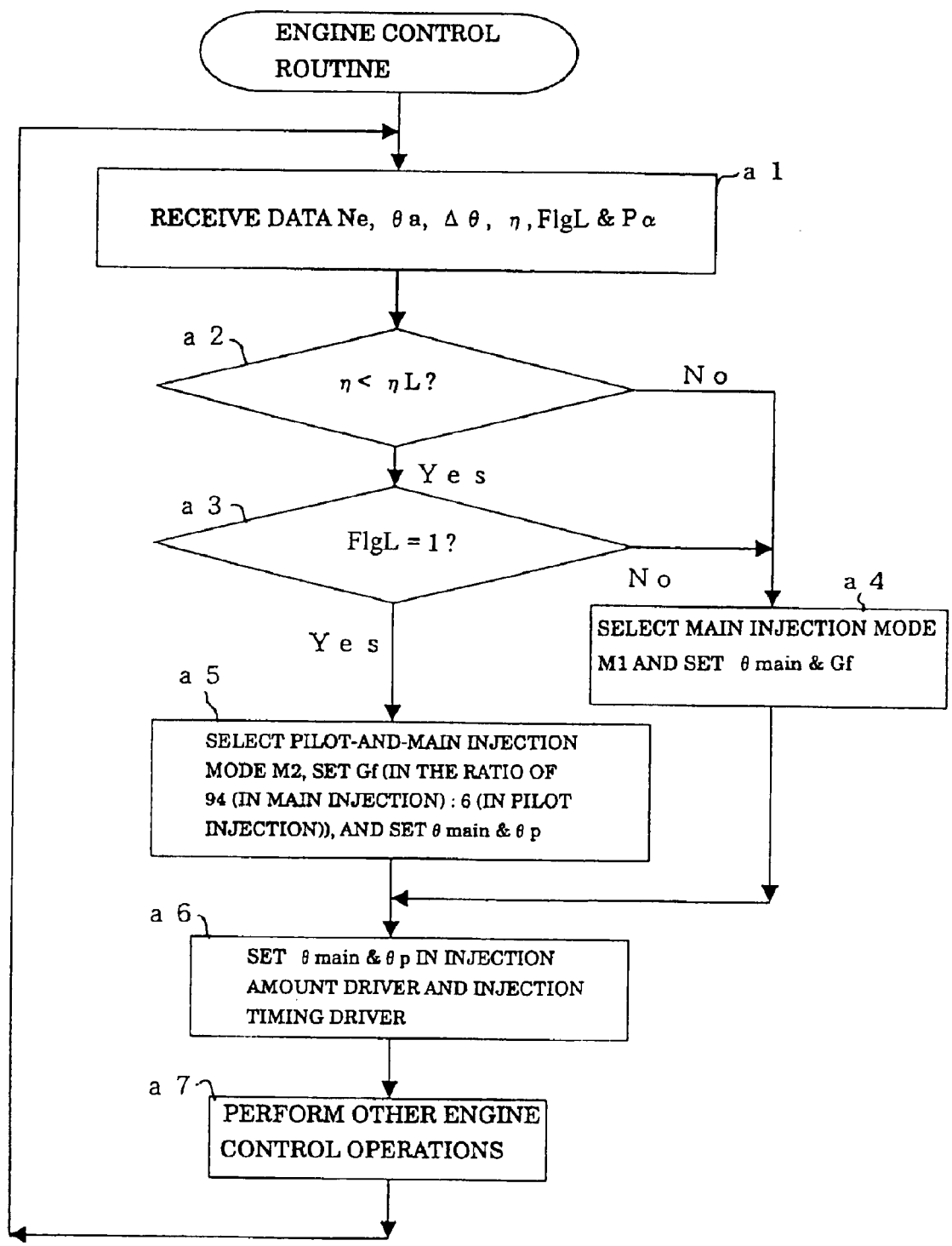
FIG. 7 is a flowchart of an engine control routine of an ECU of the engine control system.

The engine ECU3 conducts an engine control routine shown in FIG. 7. In step a1, the engine ECU3 receives engine operating data such as engine speed Ne, accelerator pedal depression θa, unit crank angle Δθ, and boost pressure Pα. Further, the engine ECU3 receives, from the exhaust system ECU4, the NOx puriying efficiency η{=(Snoxf−Snoxr)/Snox}, low temperature flag FlgL (=1 or 0) and so on. Thereafter, the process proceeds to step a2.

In step a2, it is determined whether or not the NOx purifying efficiency η is below a preset value ηL (i.e., 20%), which is used as a threshold value to determine that the NOx purifying efficiency η is clearly reduced. In this embodiment, the preset value ηL is set to be 20%. In other words, if this is not satisfied, the NOx purification efficiency η has to be improved.

When the NOx purifying efficiency η is above 20% in step a2, the process proceeds to step a4, where the engine ECU3 selects the main injection mode M1, and calculates a main injection timing θ main and fuel injection amount Gf. Thereafter, the process proceeds to step a6.

If the NOx purifying efficiency η is below 20%, the process proceeds to step a3, where it is determined whether or not the catalyst temperature Tg is below the preset temperature Th (e.g., 150° C.) and whether or not the low temperature flag FlgL is 1.

If the low temperature flag FlgL is 0 and the catalyst temperature Tg is equal to or higher than the preset temperature Th, the process proceeds to step a4, where the main injection mode M1 is selected.

On the other hand, if the low temperature flag FlgL is 1, the process proceeds to step a5, where the pilot-and-main injection mode M2 is selected, main and pilot fuel injection amounts in the mode M2 are set, and the pilot injection timing θp and main injection timing θ main are calculated. Thereafter, the process proceeds to step a6.

It is assumed here that the main injection mode M1 has been selected. In step a6, an output corresponding to the calculated fuel injection amount Gf is set in an injection amount driver 111 of the injection control section 11, and the main injection timing θ main is set in an injection timing driver 112 of the injection control section 11. The injectors 10 are actuated at proper timings, thereby injecting fuel. Thereafter, the process proceeds to step a7.

Otherwise, it is assumed that the pilot-and-main injection mode M2 has been selected. In step a6, the calculated main and pilot injection amounts Gf are set in the injection amount driver 111, while the main injection timing θ main and pilot injection timing θp in the pilot-and-main injection mode M2 are set in the injection timing driver 112. The injection amount driver 111 and injection timing driver 112 start counting, so that the injectors 10 are actuated at the proper timings and inject fuel. In step a7, other engine controlling operations are conducted. Then, the process returns to step a1.

The engine control system performs the fuel injection in the pilot-and-main injection mode M2 when the NOx purifying efficiency η is equal to or less than the preset value ηL (=20%). This allows the increase of the $NO_2$/NOx ratio and the improvement of the NOx purifying efficiency η, as shown by the double-dashed line in FIG. 5. However, the NOx purifying efficiency η is usually low, i.e., p1, as shown by the solid line in FIG. 5 when the catalyst temperature Tg is approximately 200° C. In such a case, the pilot-and-main injection mode M2 is adopted as described above, so that the NOx purifying efficiency η can be increased to the value p2 as shown by the double-dashed line. Therefore, the NOx purifying efficiency η can be quickly improved at a relatively low catalyst temperature, which is effective in promoting detoxification of exhaust gases.

In the engine control routine, when the NOx purifying efficiency η is below 20% in step a2, the process proceeds to step a3. In step a3, it is determined whether or not the low temperature flag FlgL is 1. If FlgL is 1, the process proceeds to step a5, where the pilot-and-main injection mode M2 is selected by the engine control system 3. The selection of the pilot-and-main injection mode M2 is determined by checking the foregoing factors (in steps a2 and a3), so that the engine control system can reliably perform the fuel injection. If the pilot-and-main injection mode M2 was selected on the basis of only one factor that happened to deviate from the preset value due to disturbances or the like, the engine control system would switch the main injection mode M1 over to the pilot-and-main injection mode M2 or vice versa extremely frequently, which would cause unstable operation of the engine control system.

Alternatively, if the NOx purifying efficiency η is below 20% in step a2, the process may directly proceed to step a5 in order to select the pilot-and-main injection mode M2. This can simplify the control process of the engine ECU3.

In the foregoing embodiment, when the NOx purifying efficiency η becomes low, the $NO_2/NOx$ ratio is assumed to be reduced, and the pilot-and-main injection mode M2 is selected. Alternatively, the pilot-and-main injection mode M2 may be selected when the $NO_2/NOx$ ratio is directly detected by an $NO_2/NOx$ ratio sensor and is found to be reduced.

Existing NOx sensors tend to have different levels of sensibility to NO and $NO_2$, and are relatively less sensible to $NO_2$. Therefore, there are differences in data collected by the NOx sensors when they measure NOx in exhaust gases as they are, and when they measure NOx by completely reducing or oxidizing NOx to NO or $NO_2$. It is possible to prepare the $NO_2/NOx$ ratio sensor on the basis of the foregoing features.

For instance, it is assumed that all of NOx is reduced to $NO_2$.

$$A-B=(1-\alpha)\times NO$$

$$B/\alpha - A = (1-\alpha) \times NO_2$$

$$NO_2/NO = \{(B/\alpha)A\}/(A\ B)\}$$

where A is a signal ($=NO+\alpha \times NO_2$) representing NOx detected by the NOx sensor as usual, B is a signal ($=\alpha \times (NO+NO_2)$) representing NOx which is completely oxidized to $NO_2$ and detected by the NOx sensor, and α denotes detection sensibility ratio between $NO_2$ and NO.

An engine control system incorporating the $NO_2/NOx$ ratio sensor is as effective and advantageous as the engine control system shown in FIG. 1.

What is claimed is:

1. An engine control system, comprising:

a NOx catalyst containing ammonia as a reducing agent, provided in an exhaust system of an internal combustion engine, and selectively reducing NOx from exhaust gases;

a reducing agent supply providing the reducing agent to the exhaust system and positioned upstream of the NOx catalyst;

a NOx sensor detecting an amount of NOx in the exhaust gases emitted by the internal combustion engine;

a fuel injection system injecting fuel to the internal combustion engine in one of a main injection mode performing a main injection and a pilot-and-main injection mode performing a pilot injection and the main injection, the pilot injection proceeding the main injection; and a control unit activating the fuel injection system in the pilot-and-main injection mode to increase a $NO_2/NOx$ ratio in the exhaust gases when a NOx purifying efficiency (η) is equal to or below a preset NOx purifying efficiency (ηL).

2. The engine control system according to claim 1, further comprising:

a catalyst temperature sensor detecting a temperature of the NOx catalyst, wherein the control unit activates the fuel injection system in the pilot-and-main injection mode in order to increase the $NO_2/NOx$ ratio in the exhaust gases when NOx purifying efficiency is equal to or below the preset purifying efficiency and when the temperature detected by the catalyst temperature sensor is below a catalyst activating temperature.

* * * * *